UNITED STATES PATENT OFFICE.

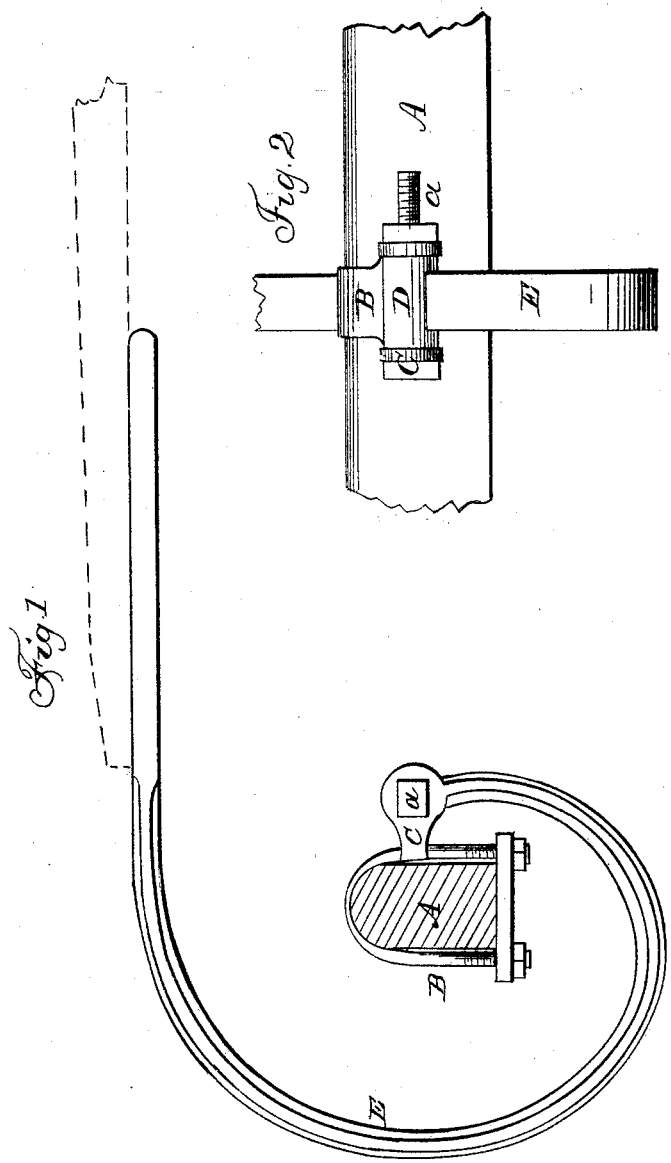

R. C. MILLINGS, OF CHARLESTON, SOUTH CAROLINA.

THILL-COUPLING.

Specification of Letters Patent No. 30,747, dated November 27, 1860.

*To all whom it may concern:*

Be it known that I, R. C. MILLINGS, of Charleston, in the district of Charleston and State of South Carolina, have invented a new and useful Improvement in Thill-Couplings; and I do hereby declare that the following is a full, clear, and exact description of the same, reference being had to the annexed drawings, making a part of this specification, in which—

Figure 1, is a side view of my invention, Fig. 2, a front view of the same.

Similar letters of reference indicate corresponding parts in the two figures.

The object of this invention is to guard against accidents attending the breaking or giving way of the coupling or clip, a contingency of frequent occurrence and one in which the driver has hitherto had but an imperfect control over the animal attached to the thills. My invention consists in having the "goose neck" of the coupling made in the form of a scroll so as to encompass or extend around the axle and form a hook to catch against the same in the event of the breaking of the coupling or the clip, the "goose neck" forming a temporary connection and preventing the immediate detachment of the thill from the axle.

To enable those skilled in the art to fully understand and construct my invention I will proceed to describe it.

A, represents a portion of the front axle of a vehicle.

B, is a clip which extends around the same and C, is a socket which is attached to the clip and receives the eye D, of a "goose neck" E, which is attached to a thill in the usual way. The eye D, is secured in the socket C, by a bolt *a*, precisely the same as that of the ordinary coupling. The "goose neck" E, instead of being curved directly upward from the clip as hitherto, is bent down and curved around the axle A, as shown clearly in Fig. 1, so as to form a hook, or the hook may be formed by bending the "goose neck" in an opposite direction. By this arrangement it will be seen that in case the clip B, should give way, or the bolt *a*, or eye D, break the "goose neck" will catch against the axle and form a temporary connection so that the driver may control the animal and prevent the detachment of the thills from the axle, thereby avoiding the accidents which frequently occur in consequence of the breaking of the thill couplings.

The invention it will be seen will not add in any appreciable degree to the expense of construction, as the "goose neck" may be very readily forged of the desired shape.

Having thus described my invention what I claim as new and desire to secure by Letters Patent, is—

Having the "goose neck" E, bent or curved so as to extend around the axle A, at its back and form a hook to catch against the axle in case of the breaking of the coupling or clip, substantially as set forth.

R. C. MILLINGS.

Witnesses:
R. C. GILCHRIST,
WILLIAM E. SCOTT.